H. W. CAMPBELL.
GRAIN DRILL.
APPLICATION FILED MAR. 23, 1912.
1,124,695.
Patented Jan. 12, 1915.
2 SHEETS—SHEET 2.
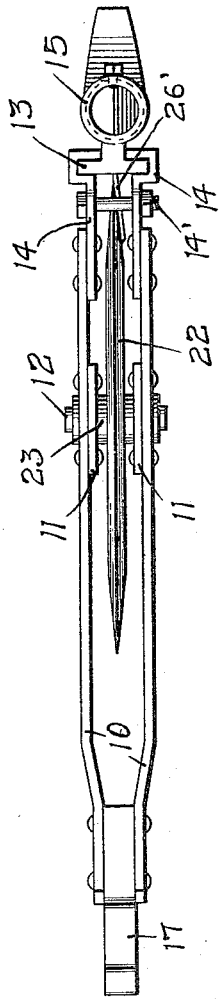
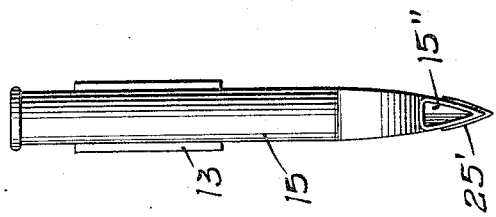
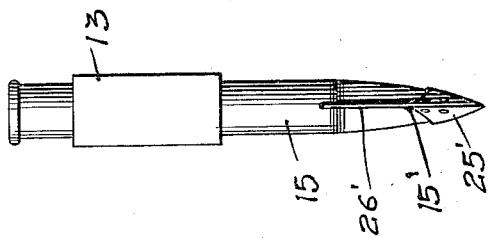
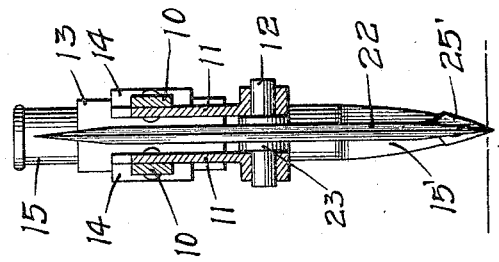
Inventor
Hardy Webster Campbell
Witnesses
Edwin G. McKee
[signature]
By Paul & Paul
Attorneys

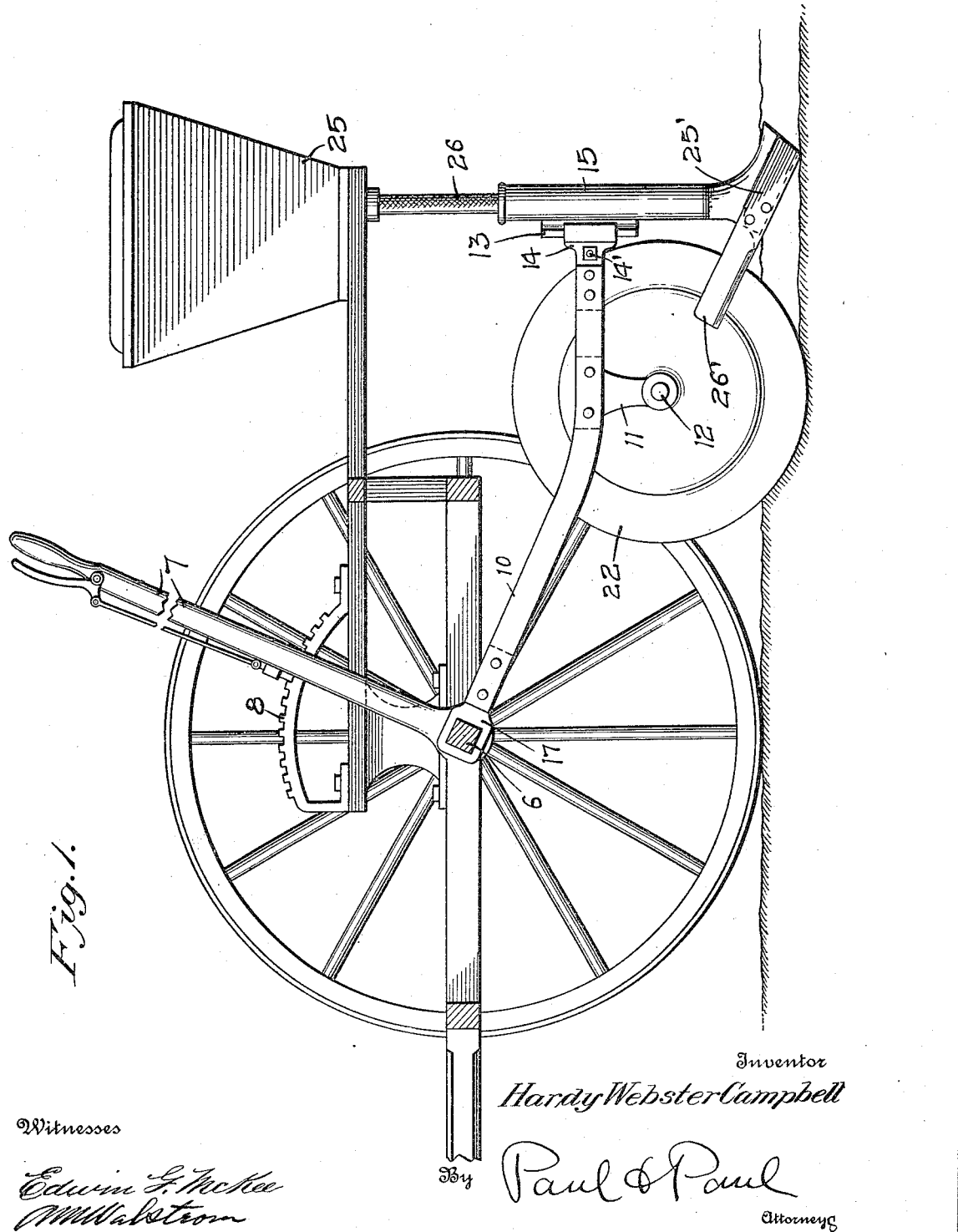

UNITED STATES PATENT OFFICE.

HARDY WEBSTER CAMPBELL, OF BETHANY, NEBRASKA.

GRAIN-DRILL.

1,124,695.          Specification of Letters Patent.      Patented Jan. 12, 1915.

Application filed March 23, 1912. Serial No. 685,885.

*To all whom it may concern:*

Be it known that I, HARDY W. CAMPBELL, a citizen of the United States, and a resident of Bethany, in the county of Lancaster and State of Nebraska, have invented certain new and useful Improvements in Grain-Drills, of which the following is a specification, reference being had to the accompanying drawings.

This invention relates to certain novel improvements in drills and comprises a combined furrow opening and seed delivery device.

The primary object of my invention is to improve the construction and operation of that class of seeding machines in which a rotary cutter or colter is used in combination with a trailing drill point.

Another object is to provide an adjustable means for tilling the soil in such a manner as to conserve the moisture in the soil.

Another object is to provide an adjustable means for depositing the seed in the soil in such a manner as to utilize the moisture in the soil.

A still further object is to provide a seed implement in the use of which the soil is prepared to insure quick germination of the seed promoting rapid, prolific development of the roots and a vigorous growth of the plant, not only making a very meager precipitation sufficient to grow crops in arid regions, but to aid and materially increase the yield of grain.

A still further object is to provide a device of the class described that will not clog or become foul through adhering soil or earth.

Another object is to provide a seed device that will deposit seed at any depth as well as to provide a mechanism that will cut through sods or partially rotted corn stalks and other obstructions that now resist all common devices and throw the drill or shoe point out, thus making the deposits of seed uneven; also a device that will decrease the mechanism of draft of the machines, so as to make it possible for the same team to pull a much wider or larger machine.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification, and in which like numerals of reference indicate similar parts in the several views: Figure 1 shows a side elevation of a grain drill provided with my attachment, Fig. 2 shows a top view of the disk and means connecting the drill point thereto, Fig. 3 shows a front elevation of the disk and drill point with the connecting bars in section, Fig. 4 shows a front elevation of the drill point, Fig. 5 shows a detached rear view of the drill point.

The primary aim of my invention is to so arrange the disk and drill point or shoe of a seeding machine that the latter will trail in the cut made by the disk, making a hard walled V-shaped cleft or fissure into which the seed drops. This construction also results in the seed being evenly distributed. There is a further advantage in that there is less friction to overcome and consequently less wear than in the seed machines as usually constructed, while the cutter will work through any ordinary obstruction as roots and partially rotted corn stalks and light rubbish.

To scientifically deposit seed in a field there should be about two inches of loose soil mulch provided by the harrow or other cultivating devices; then the seed should be put about one inch in the solid soil under the mulch. The machine which I have invented is admirably adapted for obtaining this result, as the sharp disk passing through the loose mulch makes a V-shaped cleft in the solid soil under the mulch and in this the seed is deposited by the drill point.

In carrying out the objects of my invention I employ main supporting drag bars 10, which are secured to the axle 6 or other part of the seeding machine by the block 17. An ordinary operating lever 7 is employed which works in conjunction with a rack segment 8, of usual construction so that the supporting bars 10, may be raised or lowered in bringing the disks and drill points into or out of working position.

Extending from and secured to the main supporting bars 10, are the hangers 11. These hangers at their lower ends carry the disk shaft 12, to which the disk 22 is secured. These disks 22 are each flat with a knife edge and they are strengthened by means of the hubs 23, as shown in Fig. 3. The bars 10 are arranged in pairs and the disks are arranged between them as shown in Figs. 2 and 3.

The bars 10 preferably extend beyond the hangers 11 and to the rear end of each bar is secured a clamp plate 14, the ends of said plate being bent to form right angled grooves facing each other. A bolt 14' connects the clamping plates 14 and is provided with a suitable nut by means of which said clamping plates may be drawn closer toward each other.

I provide a drill point 15, preferably consisting of a tube and preferably having its lower end turned backward and made of wedge-shape, with the sharp cutting edge 15' forward and in line with the disk 22. This provides a substantially triangular opening 15'' for the discharge of grain from the rear end of the tube into the V-shaped cleft or fissure as hereinafter specified. A T-shaped block 13 is provided upon the drill point near the middle portion thereof and this block is engaged by the clamping plates 14 and thereby the drill point is firmly connected to the rear ends of the main bars 10. This connection is an adjustable one, as by loosening the bolt 14' the said tube may be raised or lowered and by tightening the bolt the plate 14 may be firmly clamped to the block 13 thereby securing the said tube in any desired position. A suitable hopper 25 is provided upon the frame of the machine and from this the usual flexible tubes 26 extend into the upper ends of the tube of the drill points 15.

The rear open end of the drill point is preferably cut off at an angle of about 45 degrees to the perpendicular so as to permit the seed to pass out of the drill point into the fissure or cleft in the soil, while the soil at the top of the cleft is held back and prevented from falling into the cleft by the upper portion of the rear end of said drill point. (See Fig. 1).

Secured preferably to the bottom of the tube of the drill point is a plate 25' which extends forward substantially on a line with the hub of the disk and is formed at its forward end into a scraper 26', which engages the side of the disk. This plate at its lower or rear portion is preferably of V-shape in cross section and fits on to the bottom of the V-shaped drill point and is riveted thereto. The forward or scraper portion 26' of the plate has its lower edge preferably sharpened and it stands at an angle to the face of the disk. The V-shaped portion of the plate forms a wearing surface for the bottom of the drill point. The scraper keeps the disk clean and prevents picking up of dirt or refuse and passing it up between the drill tube and the disk.

In using this device the soil, as above stated, is preferably loosened for a depth of about two inches, while below that the soil is solid. In moving the machine over the field and rotary disk cuts a V-shaped crevice or fissure in the solid soil. The drill point having the sharpened forward edge is dragged with comparative ease through the cut made by the rotary disk and the result is that a V-shaped fissure is formed in the earth having firm and solid walls for a little distance up, which permits the dropping of the small seeds to the bottom where they are enveloped on both sides by solid moist soil, the loose fine dirt falling in from above, giving an ideal condition for quick germination. The moment the little rootlets reach out they enter this fine, firm soil which is conducive to the rapid growth and increased number of rootlets. Numerous experiments have shown that loose soil around a newly planted seed seriously retards its germination and growth. With drills as ordinarily constructed it is very frequent that partially rotted sod or corn stalks or clots of manure when moist become tough and form resistance that throws the drill up. Another difficulty in the use of ordinary drills is the very loose, open condition of the space left for the deposit of seeds, which causes slow and sometimes no germination until a heavy rain moistens the soil. Both of these difficulties are overcome by the use of my device. With this construction the rotating disk or colter will cut through almost any substance and the drill point which is sharp in front follows closely behind the rotary disk, the point of the drill being preferably slightly above the extreme lower cut of the disk. The advantage of this is in securing an even distribution of the seed. The machine also has much less friction, making it possible for the same team to pull a very much larger machine. The construction of the machine is also very much cheaper than the construction of the ordinary drill. With this machine the seed is always deposited in solid soil where there is a quick and prolific development of roots. With this machine the soil is scientifically handled at seed time, and whether it rains within a week or not for six months there is ample moisture in the solid soil beneath the mulch for the germination of the seed and growth of the plants. If the seed is deposited in loose soil, the loosened condition of the soil permits it to dry out which retards germination, while, with the seed deposited in a narrow crevice made in solid moist soil, there will be a very quick germination. This causes early growth, while grain deposited in loose soil will be days and sometimes weeks in making a start.

The details of the construction may be varied in many particulars without departing from my invention.

I claim as my invention:

1. In a grain drill, the combination, with a vertically arranged disk or colter having a V-shaped cutting edge, of a seed tube arranged in the rear of said disk, and having a drill point with its lower end turned backward, and of wedge shape, with the cutting edge forward and in line with said disk.

2. In a grain drill, the combination, with a vertically arranged flat disk or colter, having a V-shaped cutting edge, of a seed tube arranged in the rear of said disk and having a drill point with a backwardly turned wedge-shaped lower end, and with a forward cutting edge in line with said disk, substantially as described.

3. In a grain drill, the combination, with a vertically arranged flat disk or colter, having a V-shaped cutting edge, of a seed tube arranged in the rear of said disk and having a drill point provided with a wedge-shaped lower end, a V-shaped plate secured to the bottom of said drill point and provided with a spring extension projecting forwardly into engagement with said disk, substantially as described.

In witness whereof, I have hereunto set my hand this 31st day of Aug. 1911.

HARDY WEBSTER CAMPBELL.

Witnesses:
E. MURRAY,
GUY E. REED.